United States Patent
Inoue et al.

(10) Patent No.: US 9,162,638 B2
(45) Date of Patent: Oct. 20, 2015

(54) AUTOMOTIVE ELECTRIC POWER SUPPLY SYSTEM

(75) Inventors: Masaya Inoue, Tokyo (JP); Takahiro Urakabe, Tokyo (JP); Takuto Yano, Tokyo (JP); Hideki Sugita, Tokyo (JP); Atsutoshi Takada, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 832 days.

(21) Appl. No.: 13/382,205

(22) PCT Filed: Apr. 12, 2010

(86) PCT No.: PCT/JP2010/056507
§ 371 (c)(1),
(2), (4) Date: Jan. 4, 2012

(87) PCT Pub. No.: WO2011/010493
PCT Pub. Date: Jan. 27, 2011

(65) Prior Publication Data
US 2012/0126614 A1 May 24, 2012

(30) Foreign Application Priority Data
Jul. 24, 2009 (JP) .................. 2009-172986

(51) Int. Cl.
*B60L 1/00* (2006.01)
*B60L 3/00* (2006.01)
(Continued)

(52) U.S. Cl.
CPC .............. *B60R 16/033* (2013.01); *F02N 11/08* (2013.01); *F02N 11/0866* (2013.01);
(Continued)

(58) Field of Classification Search
USPC ......................................................... 307/10.1
See application file for complete search history.

(56) References Cited

U.S. PATENT DOCUMENTS

| | | | |
|---|---|---|---|
| 8,087,401 | B2 | 1/2012 | Inoue et al. |
| 2003/0029654 | A1* | 2/2003 | Shimane et al. ............. 180/65.4 |
| 2010/0051363 | A1 | 3/2010 | Inoue et al. |

FOREIGN PATENT DOCUMENTS

| | | |
|---|---|---|
| DE | 40 28 242 A1 | 3/1992 |
| DE | 103 13 081 A1 | 10/2004 |

(Continued)

OTHER PUBLICATIONS

Extended European Search Report issued Aug. 19, 2014 in Patent Application No. 10802114.8.
(Continued)

*Primary Examiner* — Rexford Barnie
*Assistant Examiner* — Xuan Ly
(74) *Attorney, Agent, or Firm* — Oblon, McClelland, Maier & Neustadt, L.L.P.

(57) ABSTRACT

The main electric power source is connected to a lower-voltage side of a DC/DC converter by a first switch, and an electrical double-layer capacitor and a regulator circuit is connected to a higher-voltage side of the DC/DC converter. In addition, permanent magnets are disposed on a rotor so as to generate a magnetic field that is in a reverse direction to excitation by a field coil inside a claw-shaped magnetic pole portion of the rotor. A power supply control circuit controls opening and closing of the first switch so as to be in an open state when the engine is at rest, and so as to be set to a connected state after the regulator circuit is operated to make the alternator generate electric power to precharge the electrical double-layer capacitor after the engine is started.

6 Claims, 7 Drawing Sheets

(51) Int. Cl.
*B60R 16/033* (2006.01)
*F02N 11/08* (2006.01)
*H02J 1/10* (2006.01)
*H02J 7/34* (2006.01)
*H02P 9/30* (2006.01)
*H02P 9/48* (2006.01)
*H02M 3/158* (2006.01)
*H02P 101/45* (2015.01)

(52) U.S. Cl.
CPC ............... *H02J 1/102* (2013.01); *H02J 7/345* (2013.01); *H02P 9/305* (2013.01); *H02P 9/48* (2013.01); *F02N 2011/0885* (2013.01); *F02N 2011/0888* (2013.01); *H02M 3/1582* (2013.01); *H02P 2101/45* (2015.01); *H02P 2201/07* (2013.01)

(56) References Cited

FOREIGN PATENT DOCUMENTS

| | | |
|---|---|---|
| EP | 1 628 379 A2 | 2/2006 |
| JP | 05 099105 | 4/1993 |
| JP | 2003 061209 | 2/2003 |
| JP | 2004 104936 | 4/2004 |
| JP | 2004 108226 | 4/2004 |
| JP | 2004104936 A * | 4/2004 |
| JP | 2005 304122 | 10/2005 |
| JP | 2005304122 A * | 10/2005 |
| JP | 2007306759 A * | 11/2007 |

OTHER PUBLICATIONS

International Search Report Issued May 18, 2010 in PCT/JP10/056507 Filed Apr. 12, 2010.

* cited by examiner

AUTOMOTIVE ELECTRIC POWER SUPPLY SYSTEM

TECHNICAL FIELD

The present invention relates to a dual power-source automotive electric power supply system to which are mounted a low-voltage main battery such as a lead-acid storage battery, and an electrical double-layer capacitor that accommodates large instantaneous loads, for example.

BACKGROUND ART

Conventional automotive electric power supply systems include: a generator that is interposed in a pathway that transmits movement driving forces of an automotive vehicle, and that generates electric power on passage of an excitation current to a field coil from a main electric power source of the vehicle; a capacitor that stores the electric power that is generated by the generator; a DC/DC converter that converts high voltage from the generator to a voltage of the main electric power source; and a power generation controlling means that operates the generator during deceleration of the automotive vehicle in response to operating states of the vehicle and a charged state of the capacitor. In conventional automotive electric power supply systems, deceleration energy is recovered as electric power during deceleration of the vehicle by operating the generator in response to the operating states of the vehicle and the charged state of the capacitor to generate a higher voltage than the main electric power source, and storing the generated electric power in the capacitor, and the generated high voltage is converted to the voltage of the main electric power source by the DC/DC converter and used (see Patent Literature 1, for example).

CITATION LIST

Patent Literature

Patent Literature 1: Japanese Patent Laid-Open No. HEI 07-264708 (Gazette)

SUMMARY OF THE INVENTION

Problem to be Solved by the Invention

However, in conventional automotive electric power supply systems, because the low-voltage main electric power source and the high-voltage capacitor are connected via the DC/DC converter, if the automotive vehicle is left for a long time during parking, etc., the capacitor starts gradually self-discharging through internal resistance, and eventually reaches a voltage that is lower than the main electric power source. Dark current then begins to flow through internal circuitry in the non-insulated DC/DC converter, and problems arise such as the main electric power source also starting to discharge gradually, etc., reducing electric power supply capacity.

In order to solve this problem, it is conceivable to dispose a switch in the pathway from the capacitor to the main electric power source. Specifically, the switch is left open to disconnect the capacitor from the main electric power source to avoid discharging of the main electric power source that results from the self-discharging of the capacitor. However, if the switch is closed when the capacitor is discharged completely, the main electric power source and the capacitor are initially short-circuited, and a large current flows to the capacitor from the main electric power source. Thus, it is necessary to design the circuitry for the DC/DC converter so as to allow for this large current, giving rise to new problems such as the DC/DC converter becoming large and complex.

In order to solve this new problem, it is conceivable to precharge the capacitor before closing the switch to make the voltage of the capacitor higher than the voltage of the main electric power source. In other words, because the switch is closed when the voltage of the capacitor is higher than the voltage of the main electric power source, the large current can be prevented from flowing to capacitor from the main electric power source. However, in order to precharge the capacitor, it is necessary to start a power generating operation of the generator, requiring a field current to be supplied to the generator from the main electric power source through a field current controlling circuit. Thus, problems also arise such as the electric power supply voltage that is closed in the field current controlling circuit being the voltage of the main electric power source, etc., and high-flux, high-output power generation cannot be achieved.

The present invention aims to solve the above problems and an object of the present invention is to provide an automotive electric power supply system that can prevent deterioration in electric power supply capacity due to discharging of a main electric power source, that can prevent large currents flowing from the main electric power source to a capacitor when a switch is closed, and that can achieve high-flux, high-output power generation, by connecting the low-voltage main electric power source and the high-voltage capacitor by means of a DC/DC converter, disposing a switch in a pathway that extends from the capacitor to the main electric power source, and connecting a regulator circuit to the high-voltage side of the DC/DC converter, leaving the switch open when an engine is in a rest state, making the generator generate power to precharge the capacitor after the engine is started, and then setting the switch to a connected state.

Means for Solving the Problem

In order to achieve the above object, according to one aspect of the present invention, there is provided an automotive electric power supply system characterized in including: a non-insulated DC/DC converter that is configured so as to be able to convert voltage bidirectionally between a higher-voltage input/output terminal and a lower-voltage input/output terminal; an automotive main electric power source that is connected to the lower-voltage input/output terminal of the DC/DC converter by means of a first switch; a capacitor that is connected to the higher-voltage input/output terminal of the DC/DC converter, and that has a rated maximum value that is a higher voltage than a rated voltage of the main electric power source; an alternator that is connected to the higher-voltage input/output terminal of the DC/DC converter, and that has a Lundell rotor to which a field coil is mounted, the alternator being driven to rotate by an engine to generate electric power; a permanent magnet that is disposed on the rotor, and that generates a magnetic field that is in a reverse direction to excitation by the field coil inside a claw-shaped magnetic pole portion of the rotor; a regulator circuit that is connected to the higher-voltage input/output terminal of the DC/DC converter, and that supplies electric power to the field coil; a starter motor that starts the engine; and a power supply control circuit that controls opening and closing of the first switch so as to be in an open state when the engine is at rest, and so as to be set to a connected state after the regulator circuit is operated to make the alternator generate electric power to precharge the capacitor after the engine is started.

Effects of the Invention

According to the present invention, because the first switch is set to the open state when the engine is at rest to disconnect the main electric power source from the DC/DC converter, situations such as the main electric power source being discharged are avoided even if the vehicle stops for a long time and the capacitor is discharged.

Because the regulator circuit is operated to make the alternator generate electric power after starting the engine, electric power is initially generated in small quantities by the alternator due to the magnetic leakage flux of the permanent magnet, and that generated electric power is stored in the capacitor. Because the regulator circuit is connected to the higher-voltage side of the DC/DC converter, the excitation current flows to the field coil due to the electric power that is stored in the capacitor, increasing the amount of power generated by the alternator, thereby increasing the accumulation of electricity by the capacitor.

In addition, because the first switch is in the connected state after the amount of electricity stored in the capacitor is increased, large currents can be prevented from flowing into the capacitor from the main electric power source. Because the voltage of the main electric power source is stepped up by the DC/DC converter and supplied to the field coil, high-flux, high-output power generation can be achieved.

BEST MODE FOR CARRYING OUT THE INVENTION

Embodiment 1

Figure 1:
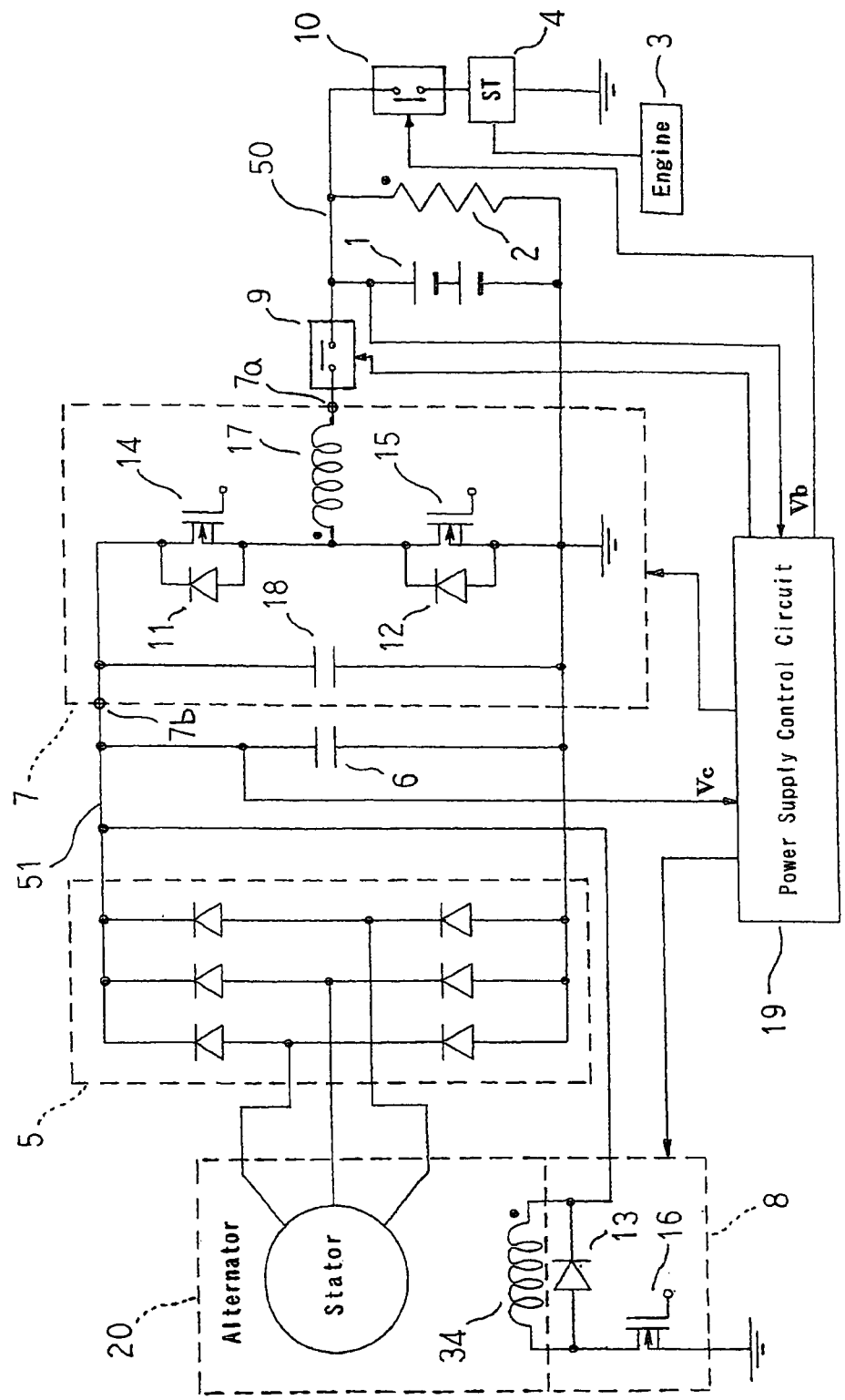
FIG. 1 is a circuit configuration diagram of an automotive electric power supply system according to Embodiment 1 of the present invention.
Figure 2:
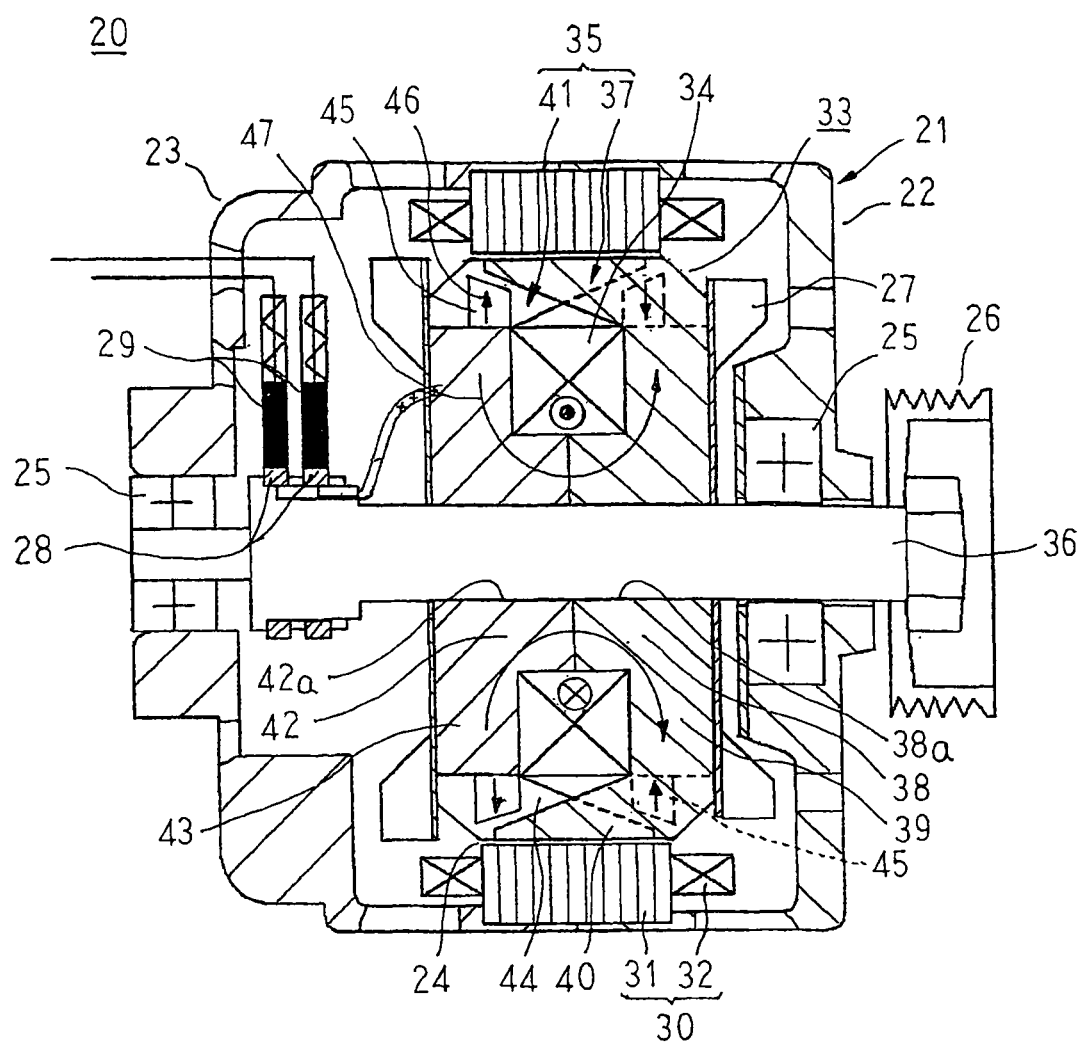
FIG. 2 is a cross section that shows a rotary electric machine that is used in the automotive electric power supply system according to Embodiment 1 of the present invention.

FIG. 1 is a circuit configuration diagram of an automotive electric power supply system according to Embodiment 1 of the present invention, and FIG. 2 is a cross section that shows a rotary electric machine that is used in the automotive electric power supply system according to Embodiment 1 of the present invention.

In FIG. 1, an automotive electric power supply system includes: a main electric power source 1 of an automotive vehicle; an on-board load 2 that is driven by electric power from the main electric power source 1; a starter motor 4 that is driven by the electric power from the main electric power source 1 to start the vehicle engine 3; an alternator 20 that is interposed in a pathway that transmits vehicle movement driving forces, and that generates a voltage that is higher than the main electric power source 1 of the vehicle; an AC/DC converting circuit 5 that converts alternating-current (AC) electric power that is generated by the alternator 20 into direct-current (DC) electric power; a non-insulated electrical double-layer capacitor 6 that functions as a capacitor that stores the DC power that is converted by the AC/DC converting circuit 5; a non-insulated DC/DC converter 7 that is configured so as to be able to convert voltage bidirectionally between a lower-voltage input/output terminal 7a and a higher-voltage input/output terminal 7b; a regulator circuit 8 that controls a quantity of electric current that is passed to a field coil of the alternator 20; and a power supply control circuit 19 that controls driving of the regulator circuit 8 and opening and closing operations of first and second switches 9 and 10.

In the automotive electric power supply system, lower-voltage wiring 50 is connected to the lower-voltage input/output terminal 7a of the DC/DC converter 7, and higher-voltage wiring 51 is connected to the higher-voltage input/output terminal 7b of the DC/DC converter 7. The main electric power source 1, the on-board load 2, and the starter motor 4 are connected to the lower-voltage wiring 50, and the AC/DC converting circuit 5, the electrical double-layer capacitor 6, and the regulator circuit 8 are connected to the higher-voltage wiring 51. A first switch 9 is interposed in a pathway of the lower-voltage wiring 50 between the main electric power source 1 and the DC/DC converter 7, and switches connection and non-connection between the main electric power source 1 and the DC/DC converter 7. In addition, a second switch 10 is interposed in a pathway of the lower-voltage wiring 50 between the main electric power source 1 and the starter motor 4, and switches connection and non-connection between the main electric power source 1 and the starter motor 4.

A lead-acid storage battery, etc., is used as the main electric power source 1, and constitutes an onboard power source for a lower-voltage system of 14 V (rated voltage), for example. The on-board load is air conditioning equipment, audio equipment, etc., and is driven by the main electric power source 1. The AC/DC converting circuit 5 is configured into a three-phase full-wave rectifying circuit using diode bridges. The rated maximum value of the electrical double-layer capacitor 6 is 28 V, for example.

The DC/DC converter 7 is configured such that a pair that includes a diode 11 and a semiconductor switching element 14 such as a metal-oxide-semiconductor field-effect transistor (MOSFET) that are connected in parallel and a pair that includes a diode 12 and a semiconductor switching element 15 are connected in series, an electric reactor 17 is connected between the pairs of serially-connected diodes 11 and 12 and semiconductor switching elements 14 and 15, and a capacitor 18 is connected in parallel with the two pairs of diodes 11 and 12 and semiconductor switching elements 14 and 15 that are connected in series.

In the DC/DC converter 7 that is configured in this manner, an input voltage of the lower-voltage input/output terminal 7a is stepped up and output to the higher-voltage input/output terminal 7b by switching the semiconductor switching element 14 ON and OFF with the semiconductor switching element 15 in an OFF state. In other words, a step-up action is achieved from the lower-voltage input/output terminal 7a to the higher-voltage input/output terminal 7b. An input voltage of the higher-voltage input/output terminal 7b is stepped down and output to the lower-voltage input/output terminal 7a by switching the semiconductor switching element 15 ON and OFF with the semiconductor switching element 14 in an ON state. In other words, a step-down action is achieved from the higher-voltage input/output terminal 7b to the lower-voltage input/output terminal 7a.

The regulator circuit 8 is made up of a diode 13 and a semiconductor switching element 16, and is configured into a chopper step-down circuit that performs unidirectional current control over a field coil 34 to achieve reductions in the number of components used and simplification of the circuit.

The power supply control circuit 19 is a microcomputer that has a central processing unit (CPU), memory, input/output circuits, etc., and monitors signals from vehicle speed sensors, rotational frequency sensors, etc., (not shown) and signals such as a voltage Vb of the main electric power source 1 and a voltage Vc of the electrical double-layer capacitor 6, and performs opening and closing control over the first and second switches 9 and 10, operational control over the DC/DC converter 7, driving control over the regulator circuit 8, etc., in response to the operating state of the vehicle and the charged state of the main electric power source 1 and the electrical double-layer capacitor 6.

Next, a configuration of the alternator 20 will be explained with reference to FIG. 2.

The alternator 20 includes: a case 21 that is constituted by a front bracket 22 and a rear bracket 23 that are each approximately bowl-shaped and made of aluminum; a Lundell rotor 33 that is rotatably disposed inside the case 21 such that a shaft 36 is supported by the case 21 by means of bearings 25; a pulley 26 that is fixed to an end portion of the shaft 36 that projects out frontward from the case 21; fans 27 that are fixed to two axial end surfaces of the rotor 33; a stator 30 that is fixed to the case 21 so as to surround an outer circumference of the rotor 33 so as to have a constant air gap 24 from the rotor 33; a pair of slip rings 28 that are fixed to a rear end of the shaft 36, and that supply electric current to the rotor 33; and a pair of brushes 29 that are disposed inside the case 21 so as to slide on the respective slip rings 28.

The stator 30 includes: a cylindrical stator core 31; and a stator coil 32 that is mounted to the stator core 31, and in which an alternating current arises due to changes in magnetic flux from the field coil 34 (described below) that accompany rotation of the rotor 33.

The rotor 33 includes: the field coil 34, which generates magnetic flux on passage of an excitation current; a pole core 35 that is disposed so as to cover the field coil 34 and in which magnetic poles are formed by that magnetic flux; and the shaft 36, which is fitted through a central axial position of the pole core 35.

The pole core 35 is configured so as to be divided into first and second pole core bodies 37 and 41 that are each made of a low carbon steel such as S10C, for example.

The first pole core body 37 has: a first boss portion 38 that has an outer circumferential surface that has a cylindrical shape, and in which a shaft insertion aperture 38a is formed so as to pass through a central axial position; a thick ring-shaped first yoke portion 39 that is disposed so as to extend radially outward from a first end edge portion of the first boss portion 38; and first claw-shaped magnetic pole portions 40 that are disposed so as to extend toward a second axial end from outer circumferential portions of the first yoke portion 39. Eight, for example, first claw-shaped magnetic pole portions 40 are formed so as to have a tapered shape in which a radially-outermost surface shape is an approximately trapezoidal shape, a circumferential width gradually becomes narrower toward a tip end, and a radial thickness gradually becomes thinner toward the tip end, and are arranged on the outer circumferential portions of the first yoke portion 39 at a uniform angular pitch circumferentially.

The second pole core body 41 has: a second boss portion 42 that has an outer circumferential surface that has a cylindrical shape, and in which a shaft insertion aperture 42a is formed so as to pass through a central axial position; a thick ring-shaped second yoke portion 43 that is disposed so as to extend radially outward from a second end edge portion of the second boss portion 42; and second claw-shaped magnetic pole portions 44 that are disposed so as to extend toward a first axial end from outer circumferential portions of the second yoke portion 43. Eight, for example, second claw-shaped magnetic pole portions 44 are formed so as to have a tapered shape in which a radially-outermost surface shape is an approximately trapezoidal shape, a circumferential width gradually becomes narrower toward a tip end, and a radial thickness gradually becomes thinner toward the tip end, and are arranged on the outer circumferential portions of the second yoke portion 43 at a uniform angular pitch circumferentially.

Thus, the first and second pole core bodies 37 and 41 are made into identical shapes, and are fixed to the shaft 36 that has been fitted through the shaft insertion apertures 38a and 42a such that the first and second claw-shaped magnetic pole portions 40 and 44 alternately intermesh and a second end surface of the first boss portion 38 is abutted to a first end surface of the second boss portion 42. The field coil 34, which is mounted onto a bobbin (not shown), is thereby mounted in a space that is surrounded by the first and second boss portions 38 and 42, the first and second yoke portions 39 and 43, and the first and second claw-shaped magnetic pole portions 40 and 44. Here, the first and second boss portions 38 and 42 and the first and second yoke portions 39 and 43 correspond to a boss portion and a pair of yoke portions of the pole core 35. Furthermore, tip end portions of the first and second claw-shaped magnetic pole portions 40 and 44 overlap with the second and first yoke portions 43 and 39, respectively, in the axial direction.

Permanent magnets 45 are sintered rare-earth magnets, for example, and are disposed on the first yoke portion 39 so as to face inner circumferential surfaces the near tip ends of the second claw-shaped magnetic pole portions 44, and are disposed on the second yoke portion 43 so as to face inner circumferential surfaces near the tip ends of the first claw-shaped magnetic pole portions 40. The permanent magnets 45 are magnetically oriented in directions of magnetization 46 that are opposite to the orientation of a magnetic field 47 that the field current that flows through the field coil 34 produces in a plane that is perpendicular to a central axis of the rotor 33.

The field coil 34 is connected to the regulator circuit 8 by means of the slip rings 28 and the brushes 29, and the stator coil 32 is connected to the AC/DC converting circuit 5.

Here, the regulator circuit 8 and the AC/DC converting circuit 5 are disposed outside the alternator 20, but the regulator circuit 8 and the AC/DC converting circuit 5 may also be disposed inside the case 21, and be configured integrally with the alternator 20.

Next, operation of the alternator 20 that is configured in this manner will be explained.

First, an electric current is supplied to the field coil 34 of the rotor 33 by means of the brushes 29 and the slip rings 28 to generate magnetic flux. The first claw-shaped magnetic pole portions 40 of the first pole core body 37 are magnetized into North-seeking (N) poles by this magnetic flux, and the second claw-shaped magnetic pole portions 44 of the second pole core body 41 are magnetized into South-seeking (S) poles.

At the same time, rotational torque from the engine 3 is transmitted to the shaft 36 by means of a belt (not shown) and the pulley 26, rotating the rotor 33. Thus, a rotating magnetic field is applied to the stator coil 32 of the stator 30, generating electromotive forces in the stator coil 32. The alternating currents generated by these electromotive forces are rectified into direct current by the AC/DC converting circuit 5 to charge the electrical double-layer capacitor 6.

Next, effects due to the permanent magnets 45 being mounted will be explained.

First, magnetic flux that is generated when the current is passed through the field coil 34 enters tooth portions of the stator core 31 by passing through the air gap 24 from the first claw-shaped magnetic pole portions 40. The magnetic flux then passes circumferentially through a core back portion from the tooth portions of the stator core 31, and enters neighboring second claw-shaped magnetic pole portions 44 by passing through the air gap 24 from the tooth portions that face those second claw-shaped magnetic pole portions 44. Next, the magnetic flux that has entered the second claw-shaped magnetic pole portions 44 passes through the second yoke portion 43, the second boss portion 42, the first boss portion 38, and the first yoke portion 39, and reaches the first claw-shaped magnetic pole portions 40. Now, in a conventional Lundell rotor, because the first and second pole core bodies are at their design limit, they are magnetically saturated by the magnetic field that is generated by the field coil, reducing magnetic flux that is generated by the rotor.

On the other hand, to interlink with the stator core 41, it is necessary for the magnetic flux that originates from the permanent magnets 45 to make a round trip across the air gap 24, which has a large magnetic resistance. The permanent magnets 45 are disposed radially inside the second and first claw-shaped magnetic pole portions 44 and 40, and are disposed so as to circuit in a shorter magnetic path length to the inner circumferential surface sides of the first and second claw-shaped magnetic pole portions 40 and 44. Thus, a large portion of the magnetic flux that originates from the permanent magnets 45 forms a closed magnetic circuit inside the rotor 33 without going around through the stator core 41. A small remaining portion of the magnetic flux that originates from the permanent magnets 45 becomes magnetic leakage flux and interlinks with the stator core 41.

Here, the permanent magnets 45 are magnetically oriented so as to be opposite to the orientation of the magnetic field 47 that is generated by the field coil 34. Thus, the magnetic flux that originates from the permanent magnets 45 is in a reverse direction to the magnetic flux that is generated by the field coil 34, enabling the magnetic flux density of the magnetic bodies that constitute the first and second pole core bodies 37 and 41 to be reduced significantly, thereby enabling magnetic saturation to be relieved. The amount of magnetic flux that interlinks with the stator 30 can thereby be increased to obtain a larger amount of generated power.

Because a small amount of magnetic flux from the magnetic flux that originates from the permanent magnets 45 interlinks with the stator core 41, the pole core 35 of the rotor 33 is excited even in a state in which field current is not flowing through the field coil 34. Induced voltage value during no-load de-energization at the maximum rotational frequency in the service conditions of the alternator 20 is designed so as to be lower than withstand voltages of both the AC/DC converting circuit 5 and the electrical double-layer capacitor 6. Thus, even if the rotational frequency of the engine 3 rises suddenly immediately after starting the engine 3 before the controlled state of the regulator circuit 8 is established, a voltage that exceeds withstand voltages will not be applied to the AC/DC converting circuit 5 or the electrical double-layer capacitor 6, enabling the need for the protective circuits, etc., to be eliminated.

Figure 3:
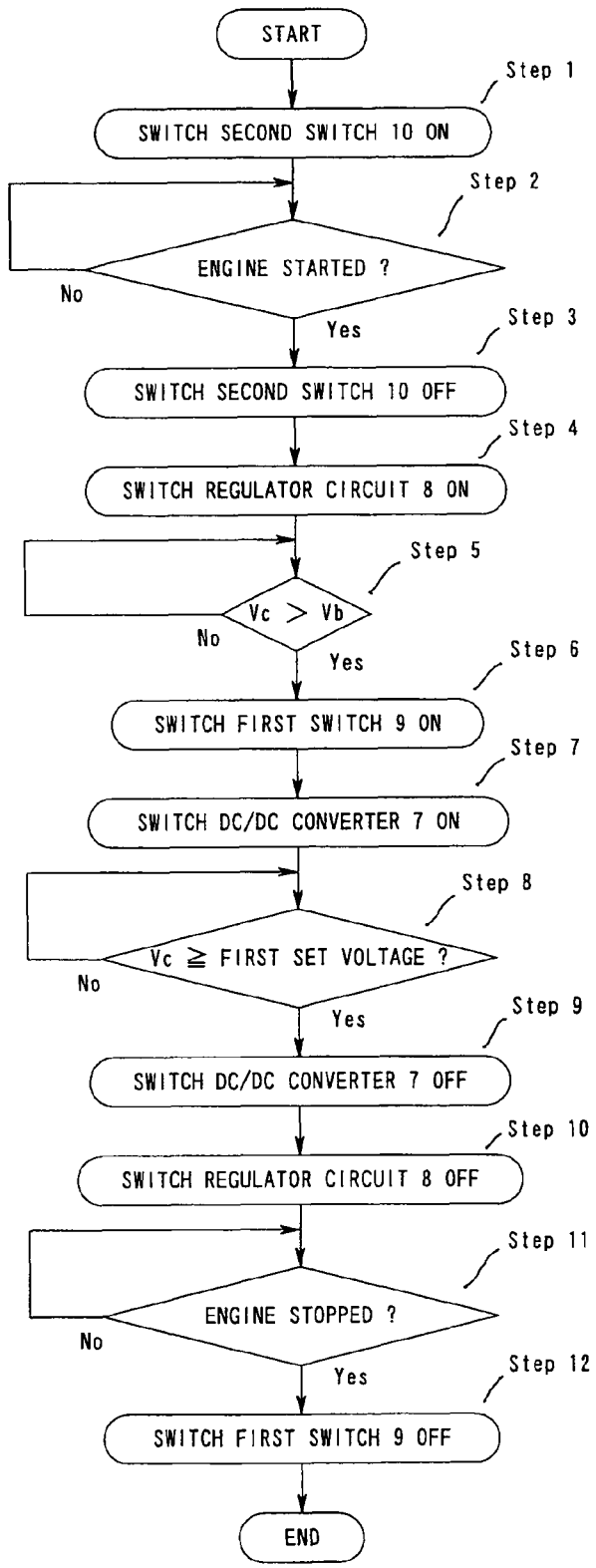
FIG. 3 is a diagram that explains basic operation by the automotive electric power supply system according to Embodiment 1 of the present invention.

Next, basic operation of an automotive electric power supply system that is configured in this manner will be explained based on operational flow in FIG. 3. FIG. 3 is a diagram that explains basic operation by the automotive electric power supply system according to Embodiment 1 of the present invention. Moreover, the initial state of the vehicle is assumed to be such that the engine 3 is in a rest state, and the first switch 9 is switched OFF. The first set voltage is the rated maximum value of the electrical double-layer capacitor 6 (28 V, for example).

First, when a key switch (not shown) is closed, the power supply control circuit 19 switches the second switch 10 ON (Step 1). Electric power from the main electric power source 1 is thereby supplied to the starter motor 4 to drive the starter motor 4. The power supply control circuit 19 monitors starting of the engine 3 (Step 2), and switches the second switch 10 OFF if the engine 3 starts (Step 3).

Next, the power supply control circuit 19 switches the regulator circuit 8 (the semiconductor switching element 16) ON (Step 4). Here, the pole core 35 is initially excited by the magnetic leakage flux of the permanent magnets 45, the generated power output is output gradually, and is rectified into direct current by the AC/DC converting circuit 5, and the electrical double-layer capacitor 6 is charged. With this charging of the electrical double-layer capacitor 6, field current flows through the field coil 34, increasing generated power output, and is rectified into the direct current by the AC/DC converting circuit 5, and the electrical double-layer capacitor 6 is charged.

The power supply control circuit 19 monitors a magnitude relationship between the voltage Vc of the electrical double-layer capacitor 6 and the voltage Vb of the main electric power source 1 (Step 5), and switches the first switch 9 ON if the voltage Vc becomes greater than the voltage Vb (Step 6). Next, the power supply control circuit 19 switches the DC/DC converter 7 ON (Step 7). Specifically, the voltage Vb of the main electric power source 1 is increased to the rated maximum value (28 V) of the electrical double-layer capacitor 6 by switching the semiconductor switching element 15 OFF, and switching the semiconductor switching element 14 ON and OFF. The voltage of the higher-voltage wiring 51 is thereby increased to 28 V, increasing the field current value that flows to the field coil 34, and thereby increasing the amount of generated power.

The power supply control circuit 19 then monitors the voltage Vc of the electrical double-layer capacitor 6, and if the voltage Vc becomes greater than or equal to the first set voltage (28 V) (Step 8), switches the DC/DC converter 7 OFF (Step 9), and also switches the regulator circuit 8 OFF (Step 10).

Then, if the engine 3 is stopped (Step 11), the power supply control circuit 19 switches the first switch 9 OFF (Step 12).

Now, when the engine 3 is stopped, electric power that is stored in the electrical double-layer capacitor 6 is discharged gradually. Thus, if the first switch 9 is omitted, dark current is supplied continuously from the main electric power source 1 through the diode 11 of the DC/DC converter 7 to the electrical double-layer capacitor 6 when the voltage Vc of the electrical double-layer capacitor 6 drops below the voltage Vb of the main electric power source 1, reducing the electric power supply capacity of the main electric power source 1.

In Embodiment 1, when the engine 3 is stopped, the first switch 9 is switched OFF, disconnecting the main electric power source 1 from the electrical double-layer capacitor 6. Thus, if the vehicle is parked for a long time with the engine stopped, the electrical double-layer capacitor 6 is discharged naturally, and even if the voltage Vc of the electrical double-layer capacitor 6 becomes lower than the voltage Vb of the main electric power source 1, situations such as the electric power supply capacity of the main electric power source 1 being lowered by being discharged are prevented.

After the engine 3 is started, the first switch 9 is switched OFF until the voltage Vc of the electrical double-layer capacitor 6 is greater than the voltage Vb of the main electric power source 1. In other words, the electrical double-layer capacitor 6 is precharged, and then the first switch 9 is switched ON. Thus, situations such as the vehicle being parked for a long time with the engine stopped, and the electrical double-layer capacitor 6 being connected to the main electric power source 1 in a depleted state are prevented. Thus, it is not necessary to increase the permissible electric current of the DC/DC converter 7, enabling reductions in size and simplification of a circuit configuration of the DC/DC converter 7. In addition, occurrences such as welding together of the first switch 9 are prevented.

Figure 4:
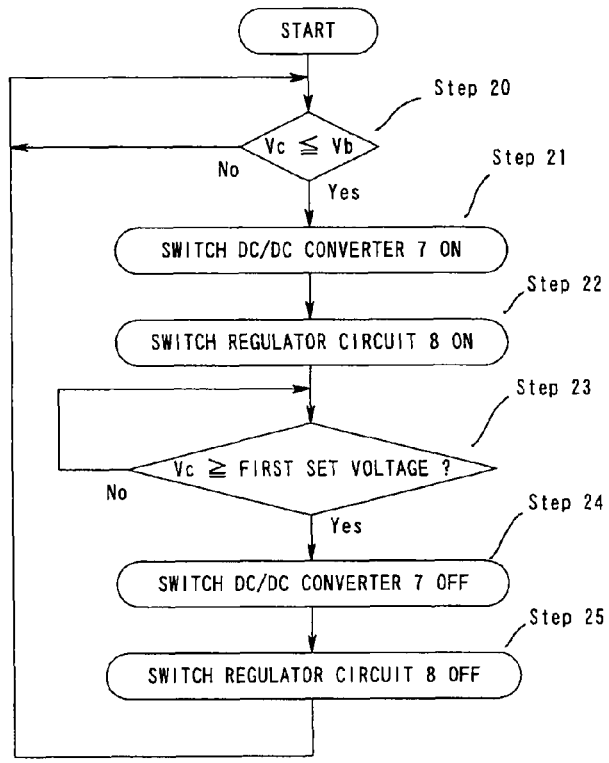
FIG. 4 is a diagram that explains an energy regenerating operation by the automotive electric power supply system according to Embodiment 1 of the present invention.

Next, an energy regenerating operation will be explained based on the operational flow in FIG. 4. FIG. 4 is a diagram that explains the energy regenerating operation by the automotive electric power supply system according to Embodiment 1 of the present invention. Moreover, the vehicle is assumed to be running, and the first switch 9 switched ON.

The power supply control circuit 19 monitors the voltage Vc of the electrical double-layer capacitor 6 (Step 20), and if the voltage Vc of the electrical double-layer capacitor 6 is less than or equal to the voltage Vb of the main electric power source 1, switches the DC/DC converter 7 ON (Step 21), and also switches the regulator circuit 8 ON (Step 22). Specifically, the voltage Vb of the main electric power source 1 is increased to the rated maximum value (28 V) of the electrical double-layer capacitor 6 by switching the semiconductor switching element 15 OFF, and switching the semiconductor switching element 14 ON and OFF. The voltage of the higher-voltage wiring 51 is thereby increased to 28 V, increasing the field current value that flows to the field coil 34, and thereby increasing the amount of generated power, and the electrical double-layer capacitor 6 is charged. Then, if the voltage Vc becomes greater than or equal to the first set voltage (28 V) (Step 23), the power supply control circuit 19 switches the DC/DC converter 7 OFF (Step 24), switches the regulator circuit 8 OFF (Step 25), and returns to Step 20.

Thus, because the regulator circuit 8 is connected to the higher-voltage side of the DC/DC converter 7, the amount of power generated by the alternator 20 can be increased by increasing the voltage. Specifically, because the alternator 20 includes the Lundell rotor 33, the coil impedance of the stator 30 is dominant during power generation, and the amount of electric current is no longer dependent on external loads at greater than or equal to a certain rotational frequency, and the amount of electric current is constant over a greater region. Consequently, output, which is the product of electric current and voltage, can be increased by increasing the generated voltage.

Because the electric current value of the regulator circuit 8 is increased such that the voltage Vb of the main electric power source 1 is increased by the DC/DC converter 7 to the rated maximum value of voltage (28 V) of the electrical double-layer capacitor 6 during deceleration, the field current can be increased.

Due to this voltage increase in the generated voltage and increase in field current, increased regeneration is enabled during decelerating operations compared to regenerative charging in which the main electric power source 1 is charged directly by generated power output by a 14-volt system during regeneration. For example, whereas regeneration is in the order of 2 kW in the regenerative charging that directly charges the 14-volt main electric power source 1, regeneration that is greater than or equal to 4 kW is enabled in the present Embodiment 1.

Because the electrical double-layer capacitor 6 is charged to a rated maximum voltage value, and then the DC/DC converter 7 and the regulator circuit 8 are switched OFF, the electric power demanded from the engine 3 for electric power generation is reduced, enabling the fuel efficiency of the engine 3 to be improved.

Figure 5:
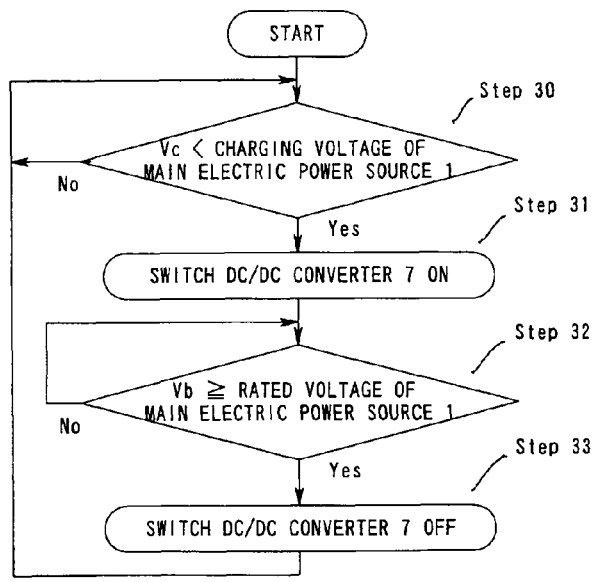
FIG. 5 is a diagram that explains a main electric power source charging operation by the automotive electric power supply system according to Embodiment 1 of the present invention.

Next, a charging operation of the main electric power source 1 will be explained based on the operational flow in FIG. 5. FIG. 5 is a diagram that explains the main electric power source charging operation by the automotive electric power supply system according to Embodiment 1 of the present invention. Moreover, the vehicle is assumed to be running, and the first switch 9 switched ON.

The power supply control circuit 19 monitors the voltage Vb of the main electric power source 1 (Step 30), and if the voltage Vb of the main electric power source 1 becomes less than the charging voltage (10V, for example) of the main electric power source 1, switches the DC/DC converter 7 ON (Step 31). Specifically, the voltage Vc of the electrical double-layer capacitor 6 is stepped down to the rated voltage (14 V, for example) of the main electric power source 1 by switching the semiconductor switching element 14 ON, and switching the semiconductor switching element 15 ON and OFF. The main electric power source 1 is thereby charged. Then, if the voltage Vb becomes greater than or equal to the rated voltage of the main electric power source 1 (Step 32), the power supply control circuit 19 switches the DC/DC converter 7 OFF (Step 33), and returns to Step 30.

Thus, because instantaneous large-current charging is not performed on the main electric power source 1 during regeneration, deterioration in the service life of the main electric power source 1 due to regeneration can be prevented.

Because the on-board load 2 is a load in the order of several hundred watts, the electric power that is stored in the electrical double-layer capacitor 6 may also be converted to low electric power by means of the DC/DC converter 7 and supplied to the on-board load 2.

Embodiment 2

Figure 6:
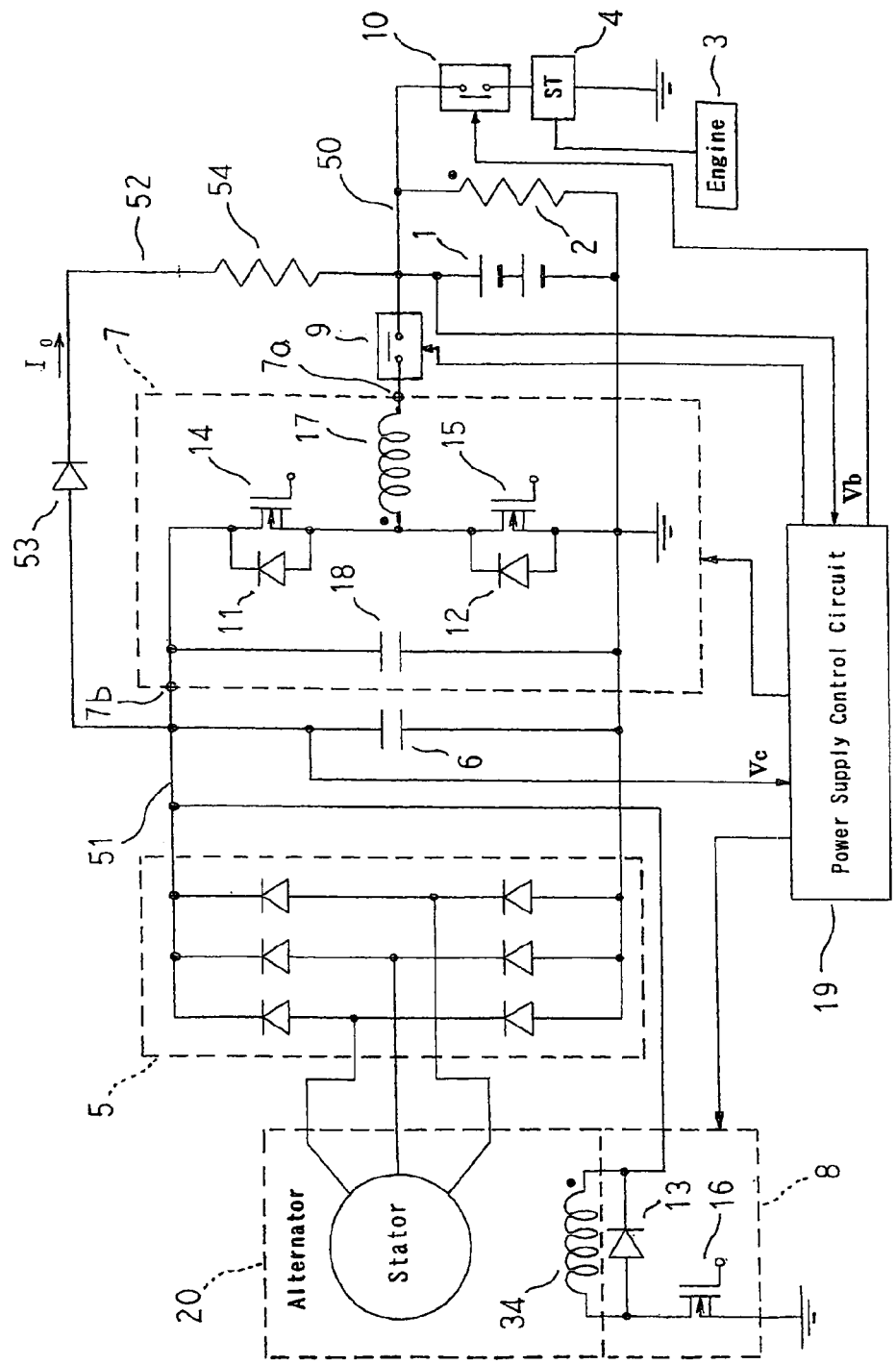
FIG. 6 is a circuit configuration diagram of an automotive electric power supply system according to Embodiment 2 of the present invention.

FIG. 6 is a circuit configuration diagram of an automotive electric power supply system according to Embodiment 2 of the present invention.

In FIG. 6, a connecting wire 52 is connected between higher-voltage wiring 51 and lower-voltage wiring 50, and a diode 53 and a resistive body 54 are interposed on the connecting wire 52 in series. A power supply control circuit 19 is configured so as to detect an electric current $I_0$ that flows through the connecting wire 52.

Moreover, the rest of the configuration is configured in a similar manner to Embodiment 1 above.

In Embodiment 2, the power supply control circuit 19 determines the magnitude relationship between the voltage Vc of the electrical double-layer capacitor 6 and the voltage Vb of the main electric power source 1 by detecting the electric current $I_0$ that flows through the connecting wire 52. Specifically, at Steps 5 and 20, the power supply control circuit 19 determines whether the voltage Vc is greater than the voltage Vb, or the voltage Vc is less than or equal to the voltage Vb, by the presence or absence of the electric current $I_0$.

Similar effects to those in Embodiment 1 above can also be achieved in Embodiment 2.

Here, because the time constant of the electric current $I_0$ is longer than that of a voltage, it can be made less susceptible to external noise if high-frequency components are slowed down using a low-pass filter.

Moreover, in Embodiment 2 above, the electric current $I_0$ that flows through the connecting wire 52 is detected, but a voltage that arises at two ends of the resistive body 54 may also be detected.

Embodiment 3

Figure 7:
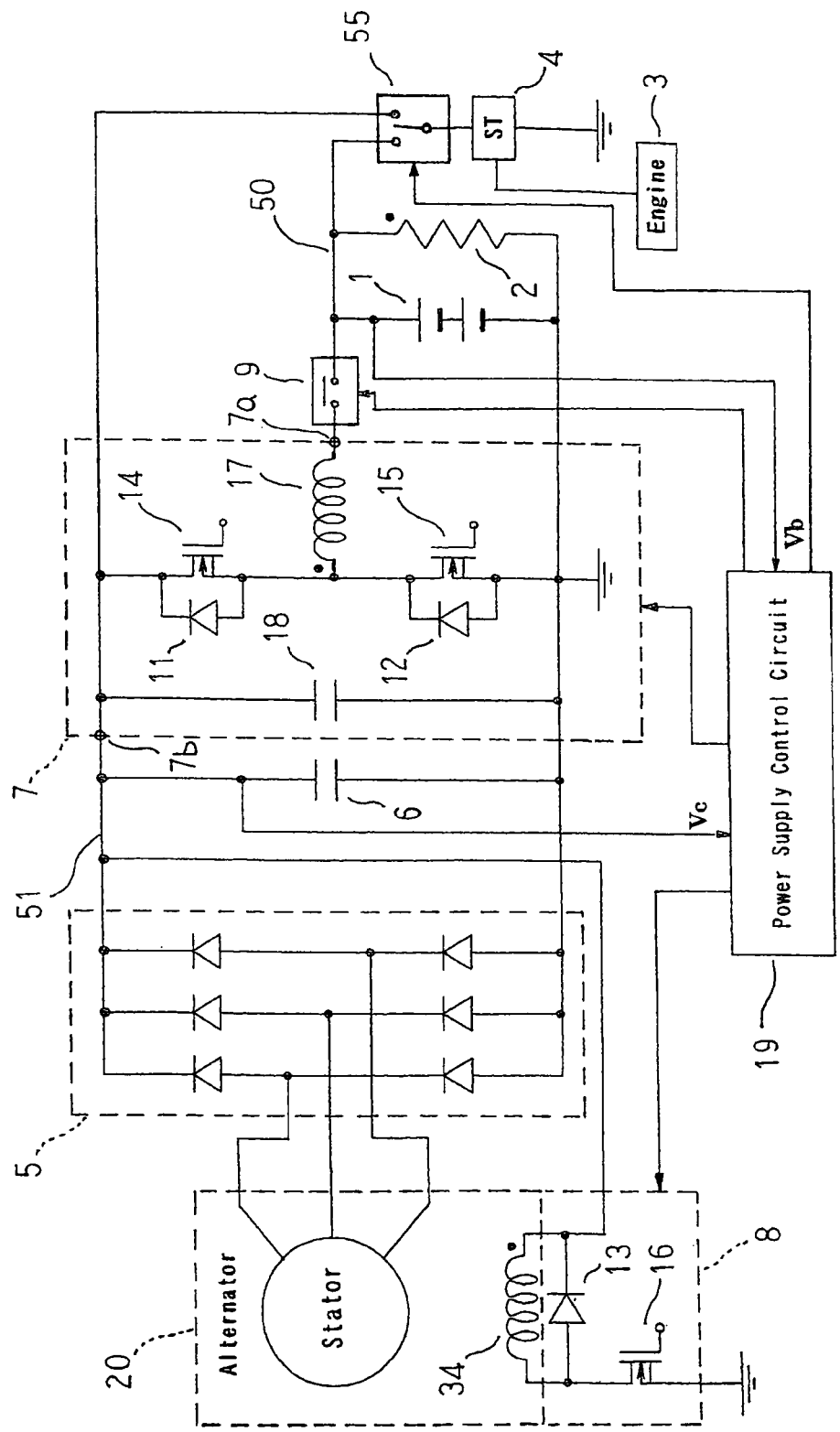
FIG. 7 is a circuit configuration diagram of an automotive electric power supply system according to Embodiment 3 of the present invention.

FIG. 7 is a circuit configuration diagram of an automotive electric power supply system according to Embodiment 3 of the present invention.

In FIG. 7, a second switch 55 is disposed so as to switch an electric power source of a starter motor 4 to a main electric power source 1 or to an electrical double-layer capacitor 6.

Moreover, the rest of the configuration is configured in a similar manner to Embodiment 1 above.

Figure 8:
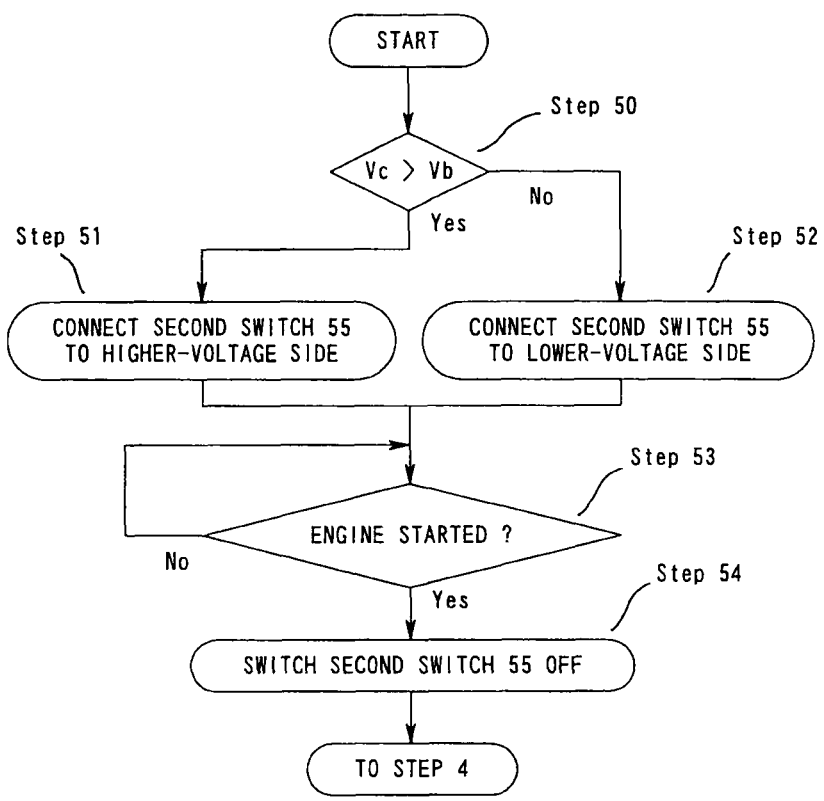
FIG. 8 is a diagram that explains an engine starting operation by the automotive electric power supply system according to Embodiment 3 of the present invention.

Next, a starting operation on the engine 3 by an automotive electric power supply system according to Embodiment 3 will be explained based on operational flow in FIG. 8. FIG. 8 is a diagram that explains an engine starting operation by the automotive electric power supply system according to Embodiment 3 of the present invention. Moreover, the initial state of the vehicle is assumed to be such that the engine 3 is in a rest state, and the first switch 9 is switched OFF.

First, if a key switch (not shown) is closed, the power supply control circuit 19 determines the magnitude relationship between the voltage Vc of the electrical double-layer capacitor 6 and the voltage Vb of the main electric power source 1 (Step 50). If it determines that the voltage Vc is greater than the voltage Vb, it then proceeds to Step 51, the second switch 55 is connected to the higher-voltage side, and the electric power from the electrical double-layer capacitor 6 is supplied to the starter motor 4. If it determines that the voltage Vc is not greater than the voltage Vb, it proceeds to Step 52, the second switch 55 is connected to the lower-voltage side, and electric power from the main electric power source 1 is supplied to the starter motor 4. The starter motor 4 is thereby driven, and the engine 3 is started. The power supply control circuit 19 then monitors starting of the engine 3 (Step 53), and switches the second switch 55 OFF if the engine 3 starts (Step 54), and then proceeds to Step 4 in FIG. 3.

In this manner, according to Embodiment 3, if the voltage Vc is greater than Vb, the engine 3 is started using the electric power that is stored in the electrical double-layer capacitor 6. Thus, since the discharging performance of the electrical double-layer capacitor 6 is superior to the main electric power source 1 which is constituted by a lead-acid storage battery, etc., the supply of electric power to the starter motor 4 is performed promptly, enabling torque assistance to be performed swiftly. Because starting operations on the engine 3 using the electric power from the main electric power source 1 are reduced, deterioration in the service life of the main electric power source 1 that is brought about by large-current discharging during starting operations can be suppressed.

Now, if the voltage Vc is less than or equal to Vb, it is conceivable that the electric power that is stored in the main electric power source 1 could be stepped up by the DC/DC converter 7 and supplied to the starter motor 4. In that case, because an overcurrent flows through the DC/DC converter 7, an overcurrent protection circuit is required in the DC/DC converter 7. However, according to Embodiment 3, because the first switch 9 is switched OFF, and the electric power that is stored in the main electric power source 1 is supplied to the starter motor 4 directly if the voltage Vc is less than or equal to Vb, it is not necessary to dispose an overcurrent protection circuit in the DC/DC converter 7.

Moreover, in each of the above embodiments, the AC/DC converting circuit is configured into a three-phase full-wave rectifying circuit that uses diode bridges, but a metal-oxide-semiconductor field-effect transistor (MOSFET) that performs synchronous rectification, or a polyphase inverter having MOSFETs that performs rectification using parasitic diodes may also be used as an AC/DC converting circuit.

In each of the above embodiments, the regulator circuit is configured so as to operate at a single electrode using a chopper step-down circuit, but the regulator circuit may also be configured using an H bridge at two electrodes.

In each of the above embodiments, the permanent magnets are disposed on the yoke portions so as to face the inner circumferential surfaces near the tip ends of the claw-shaped magnetic pole portions, but permanent magnets may also be disposed between the circumferentially adjacent claw-shaped magnetic pole portions.

The invention claimed is:

1. An automotive electric power supply system comprising:
   a non-insulated DC/DC converter that is configured so as to be able to convert voltage bidirectionally between a higher-voltage input/output terminal and a lower-voltage input/output terminal;
   an automotive main electric power source that is connected to said lower-voltage input/output terminal of said DC/DC converter by a first switch;
   a capacitor that is connected to said higher-voltage input/output terminal of said DC/DC converter, and that has a rated maximum value that is a higher voltage than a rated voltage of said main electric power source;
   an alternator that is connected to said higher-voltage input/output terminal of said DC/DC converter, and that has a Lundell rotor to which a field coil is mounted, said alternator being driven to rotate by an engine to generate electric power;
   a permanent magnet that is disposed on said rotor, and that generates a magnetic field that is in a reverse direction to excitation by said field coil inside a claw-shaped magnetic pole portion of said rotor;
   a regulator circuit that is connected to said higher-voltage input/output terminal of said DC/DC converter, and that supplies electric power to said field coil;
   a starter motor that starts said engine; and
   a power supply control circuit that controls opening and closing of said first switch so as to be in an open state when said engine is at rest, and so as to be set to a connected state after said engine is started such that said regulator circuit is operated to make said alternator generate electric power such that said alternator precharges said capacitor,
   wherein said power supply control circuit is configured so as to set said first switch to said connected state, and then operate said DC/DC converter to step up said voltage of said main electric power source to said rated maximum value of said capacitor, and also to operate said regulator circuit to make said alternator generate electric power, and to charge generated electric power from said alternator to said capacitor, wherein said power supply control circuit is configured so as to set said first switch to said connected state, on detecting that said voltage of said precharged capacitor is higher than said voltage of said main electric power source.

2. An automotive electric power supply system comprising:

a non-insulated DC/DC converter that is configured so as to be able to convert voltage bidirectionally between a higher-voltage input/output terminal and a lower-voltage input/output terminal;

an automotive main electric power source that is connected to said lower-voltage input/output terminal of said DC/DC converter by a first switch;

a capacitor that is connected to said higher-voltage input/output terminal of said DC/DC converter, and that has a rated maximum value that is a higher voltage than a rated voltage of said main electric power source;

an alternator that is connected to said higher-voltage input/output terminal of said DC/DC converter, and that has a Lundell rotor to which a field coil is mounted, said alternator being driven to rotate by an engine to generate electric power;

a permanent magnet that is disposed on said rotor, and that generates a magnetic field that is in a reverse direction to excitation by said field coil inside a claw-shaped magnetic pole portion of said rotor;

a regulator circuit that is connected to said higher-voltage input/output terminal of said DC/DC converter, and that supplies electric power to said field coil;

a starter motor that starts said engine; and a power supply control circuit that controls opening and closing of said first switch so as to be in an open state when said engine is at rest, and so as to be set to a connected state after said engine is started such that said regulator circuit is operated to make said alternator generate electric power such that said alternator precharges said capacitor, wherein said power supply control circuit is configured so as to operate said DC/DC converter to step up said voltage of said main electric power source to said rated maximum value of said capacitor, and also to operate said regulator circuit to make said alternator generate electric power, to charge generated electric power from said alternator to said capacitor if said voltage of said capacitor becomes less than or equal to said voltage of said main electric power source during operation of said engine, wherein said power supply control circuit is configured so as to set said first switch to said connected state, on detecting that said voltage of said precharged capacitor is higher than said voltage of said main electric power source.

3. An automotive electric power supply system comprising:

a non-insulated DC/DC converter that is configured so as to be able to convert voltage bidirectionally between a higher-voltage input/output terminal and a lower-voltage input/output terminal;

an automotive main electric power source that is connected to said lower-voltage input/output terminal of said DC/DC converter by a first switch;

a capacitor that is connected to said higher-voltage input/output terminal of said DC/DC converter, and that has a rated maximum value that is a higher voltage than a rated voltage of said main electric power source;

an alternator that is connected to said higher-voltage input/output terminal of said DC/DC converter, and that has a Lundell rotor to which a field coil is mounted, said alternator being driven to rotate by an engine to generate electric power;

a permanent magnet that is disposed on said rotor, and that generates a magnetic field that is in a reverse direction to excitation by said field coil inside a claw-shaped magnetic pole portion of said rotor;

a regulator circuit that is connected to said higher-voltage input/output terminal of said DC/DC converter, and that supplies electric power to said field coil;

a starter motor that starts said engine; and a power supply control circuit that controls opening and closing of said first switch so as to be in an open state when said engine is at rest, and so as to be set to a connected state after said engine is started such that said regulator circuit is operated to make said alternator generate electric power such that said alternator precharges said capacitor, wherein said power supply control circuit is configured so as to operate said DC/DC converter to step down said voltage of said capacitor to said rated voltage of said main electric power source to charge said main electric power source if said voltage of said main electric power source becomes less than a charging voltage of said main electric power source during operation of said engine, wherein said power supply control circuit is configured so as to set said first switch to said connected state, on detecting that said voltage of said precharged capacitor is higher than said voltage of said main electric power source.

4. An automotive electric power supply system comprising:

a non-insulated DC/DC converter that is configured so as to be able to convert voltage bidirectionally between a higher-voltage input/output terminal and a lower-voltage input/output terminal;

an automotive main electric power source that is connected to said lower-voltage input/output terminal of said DC/DC converter by a first switch;

a capacitor that is connected to said higher-voltage input/output terminal of said DC/DC converter, and that has a rated maximum value that is a higher voltage than a rated voltage of said main electric power source;

an alternator that is connected to said higher-voltage input/output terminal of said DC/DC converter, and that has a Lundell rotor to which a field coil is mounted, said alternator being driven to rotate by an engine to generate electric power;

a permanent magnet that is disposed on said rotor, and that generates a magnetic field that is in a reverse direction to excitation by said field coil inside a claw-shaped magnetic pole portion of said rotor;

a regulator circuit that is connected to said higher-voltage input/output terminal of said DC/DC converter, and that supplies electric power to said field coil;

a starter motor that starts said engine; and a power supply control circuit that controls opening and closing of said first switch so as to be in an open state when said engine is at rest, and so as to be set to a connected state after said engine is started such that said regulator circuit is operated to make said alternator generate electric power such that said alternator precharges said capacitor, wherein said power supply control circuit is configured so as to supply electric power from said capacitor to said starter motor during starting of said engine if said voltage of said capacitor is higher voltage than said voltage of said main electric power source, and to supply electric power from said main electric power source to said starter motor if said voltage of said capacitor is less than or equal to said voltage of said main electric power source, wherein said power supply control circuit is configured so as to set said first switch to said connected state, on detecting that said voltage of said precharged capacitor is higher than said voltage of said main electric power source.

5. An automotive electric power supply system comprising:
- a non-insulated DC/DC converter that is configured so as to be able to convert voltage bidirectionally between a higher-voltage input/output terminal and a lower-voltage input/output terminal;
- an automotive main electric power source that is connected to said lower-voltage input/output terminal of said DC/DC converter by a first switch;
- a capacitor that is connected to said higher-voltage input/output terminal of said DC/DC converter, and that has a rated maximum value that is a higher voltage than a rated voltage of said main electric power source;
- a connecting wire that connects said higher-voltage input/output terminal of said DC/DC converter and a higher-voltage side of said main electric power source;
- a diode that is interposed on said connecting wire, and that has as a forward direction an electric current that is directed from said higher-voltage input/output terminal of said DC/DC converter to said higher-voltage side of said main electric power source;
- an alternator that is connected to said higher-voltage input/output terminal of said DC/DC converter, and that has a Lundell rotor to which a field coil is mounted, said alternator being driven to rotate by an engine to generate electric power;
- a permanent magnet that is disposed on said rotor, and that generates a magnetic field that is in a reverse direction to excitation by said field coil inside a claw-shaped magnetic pole portion of said rotor;
- a regulator circuit that is connected to said higher-voltage input/output terminal of said DC/DC converter, and that supplies electric power to said field coil;
- a starter motor that starts said engine; and
- a power supply control circuit that controls opening and closing of said first switch so as to be in an open state when said engine is at rest, and operates said regulator circuit to make said alternator generate electric power to precharge said capacitor after said engine is started, monitoring presence or absence of an electric current value that passes through said diode and setting said first switch to a connected state if said voltage of said capacitor is detected to be higher than said voltage of said main electric power source by said electric current value being present.

6. The automotive electric power supply system according to claim 5, wherein said power supply control circuit is configured so as to set said first switch to said connected state, and then operate said DC/DC converter to step up said voltage of said main electric power source to said rated maximum value of said capacitor, and also to operate said regulator circuit to make said alternator generate electric power, and to charge generated electric power from said alternator to said capacitor.

* * * * *